W. C. BARKER.

Bucket for Chain-Pumps.

No. 6,531.

Reissued July 6, 1875.

WITNESSES

R. D. D. Ourand

B. C. Pole

By

INVENTOR

William C. Barker

Charles H. Fowler

Attorney

N. PETERS, PHOTO-LITHOGRAPHER, WASHINGTON, D. C.

UNITED STATES PATENT OFFICE

WILLIAM C. BARKER, OF MILLPORT, NEW YORK.

IMPROVEMENT IN BUCKETS FOR CHAIN-PUMPS.

Specification forming part of Letters Patent No. 116,138, dated June 20, 1871; reissue No. 5,878, dated May 19, 1874; reissue No. 6,531, dated July 6, 1875; application filed February 17, 1875.

*To all whom it may concern:*

Be it known that I, WILLIAM C. BARKER, of Millport, Chemung county, and State of New York, have invented certain new and useful Improvements in Buckets for Chain-Pumps; and I do hereby declare that the following is a full, clear, and exact description thereof, reference being had to the accompanying drawings, forming a part of this specification, and to the letters of reference marked thereon, in which—

Figure 1:
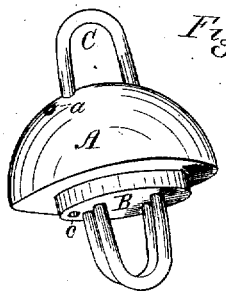
Figure 2:
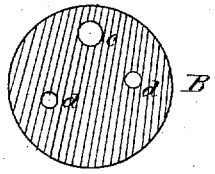
Figure 3:
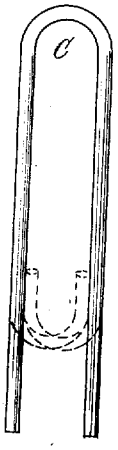
Figure 4:
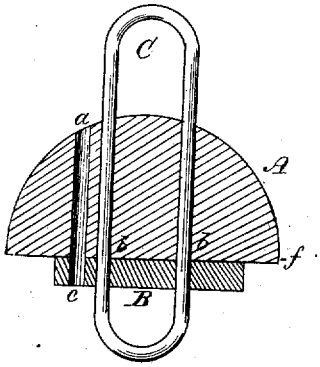

Figure 1 is a perspective view of my improved bucket with its loop and button. Fig. 2 is a plan view of the button. Fig. 3 is a plan of the loop before insertion through the bucket and button, and showing in dotted lines how the lower ends of the loop are bent up, after insertion, to form a rest for a button, which in turn forms a rest or support for the bucket. Fig. 4 is a vertical section of the bucket.

Prior to my invention there was not, as far as I am aware, in use an elastic bucket provided with a means whereby the water remaining above the bucket could escape back into the well when the pump was not in use.

The great difficulty heretofore experienced in that class of pumps where the water is drawn up by an elastic bucket tightly fitting the bore of the tube has been the continued freezing in cold weather of the water remaining in the pump-tube when the pump was not in operation, which in many cases would split or otherwise injure the wooden tube and the working parts of the pump to an extent that would render the same wholly worthless.

To remedy this evil is the principal object of my invention; and it therefore consists in providing the bucket with a suitable outlet or opening, through which the water is allowed to escape from the pump-tube down to the source of supply when the pump is not in use.

My invention also consists of a solid bucket of india-rubber or other similarly elastic material, convex or contracted upward from that part of its outer periphery which comes in contact with the interior of the pump-tube, by which I am enabled to present an elastic edge or bearing that will readily yield to any irregularities or slight differences in the interior diameter of the pump-tube, and admit of its being easily drawn up, while at the same time it will resist moving downward.

My invention further consists of a link and button or washer, to which the bucket is attached, as will be hereinafter more fully set forth.

In describing the construction and operation of my invention, A in the drawings is a representation of my improved bucket, of india-rubber or other similarly elastic material, its largest circumference being somewhat greater than the bore of the pump-tube. The bucket is convex or contracted upward from that part of its outer periphery which comes in contact with the interior of the pump-tube, thereby forming an elastic edge or bearing-surface, *f*, that will yield sufficiently to be easily drawn through the tube, while at the same time, if by any accident the operator releases his hold of the crank over which the chain runs, the bucket will not drop in the tube, but will remain where the accident left it; or, in other words, the shape or form described, together with the fact that its largest circumference is at that point where it comes in contact with the interior of the pump-tube, will readily allow it to be drawn upward, and prevent its being drawn downward or forced in the latter direction by the weight of water above it. I provide this bucket with an aperture or suitable outlet, as seen at *a*, so that when the bucket is stationary the water remaining above it is allowed to escape back into the well or source of supply, thereby preventing the possibility of the water freezing in the tube, and splitting or otherwise injuring the same. A button or washer of any suitable material, as shown at B, is provided with apertures *c d d*, the former corresponding to aperture *a* in the elastic bucket, and the latter corresponding to the apertures *b b*, through which the link passes. C represents the loop-link, made in form of an inverted letter U, as illustrated in Fig. 3 of the drawings. The open ends of this loop are passed through the apertures *b b* in the bucket A, and through the corresponding apertures *d d* in the button or washer B, care being taken that the apertures *a* in the bucket and *c* in the button are coincident with each other. Each of the loose ends of the loop are bent inward and upward until they rest against the lower side of the button, thereby holding the same in place, and forming loops above and below the bucket, by means of which to attach the same to the links of the chain.

I am aware that elastic buckets composed of a hollow sphere are not new, and I am also aware that it is not new to provide metal pail-buckets with an opening, so that when standing any water remaining in them will be allowed to escape for the purpose of insuring a fresh supply of water from the well when the buckets are raised. I do not, therefore, claim such construction of buckets; but Having fully described my invention, what I do claim as new, and desire to secure by Letters Patent, is—

1. An elastic bucket for chain-pumps, adapted to fit and work in the bore of a pump-tube to raise the water by suction, provided with a suitable orifice or outlet through which the water remaining in the pump-tube above the bucket is allowed to escape down to the source of supply, substantially as and for the purpose set forth.

2. A solid elastic bucket, having an elastic bearing-edge, and its upper portion convex or contracted from said edge, whereby the bucket will readily yield to any irregularities in the pump-tube, and admit of its being easily drawn up, while at the same time it will resist moving downward, substantially as and for the purpose specified.

3. In combination with an elastic bucket and suitable button or washer, a link of the form substantially as described, whereby the ends, after insertion through the bucket and button, are capable of being turned up to form a rest for the button, which in turn forms a rest or support for the bucket, as set forth.

WILLIAM C. BARKER.

Witnesses:
OMAR J. SANFORD,
BELA SANFORD.